March 10, 1931. W. G. E. ROLAFF 1,795,445
RECIPROCATING COMPRESSOR
Filed Nov. 21, 1927
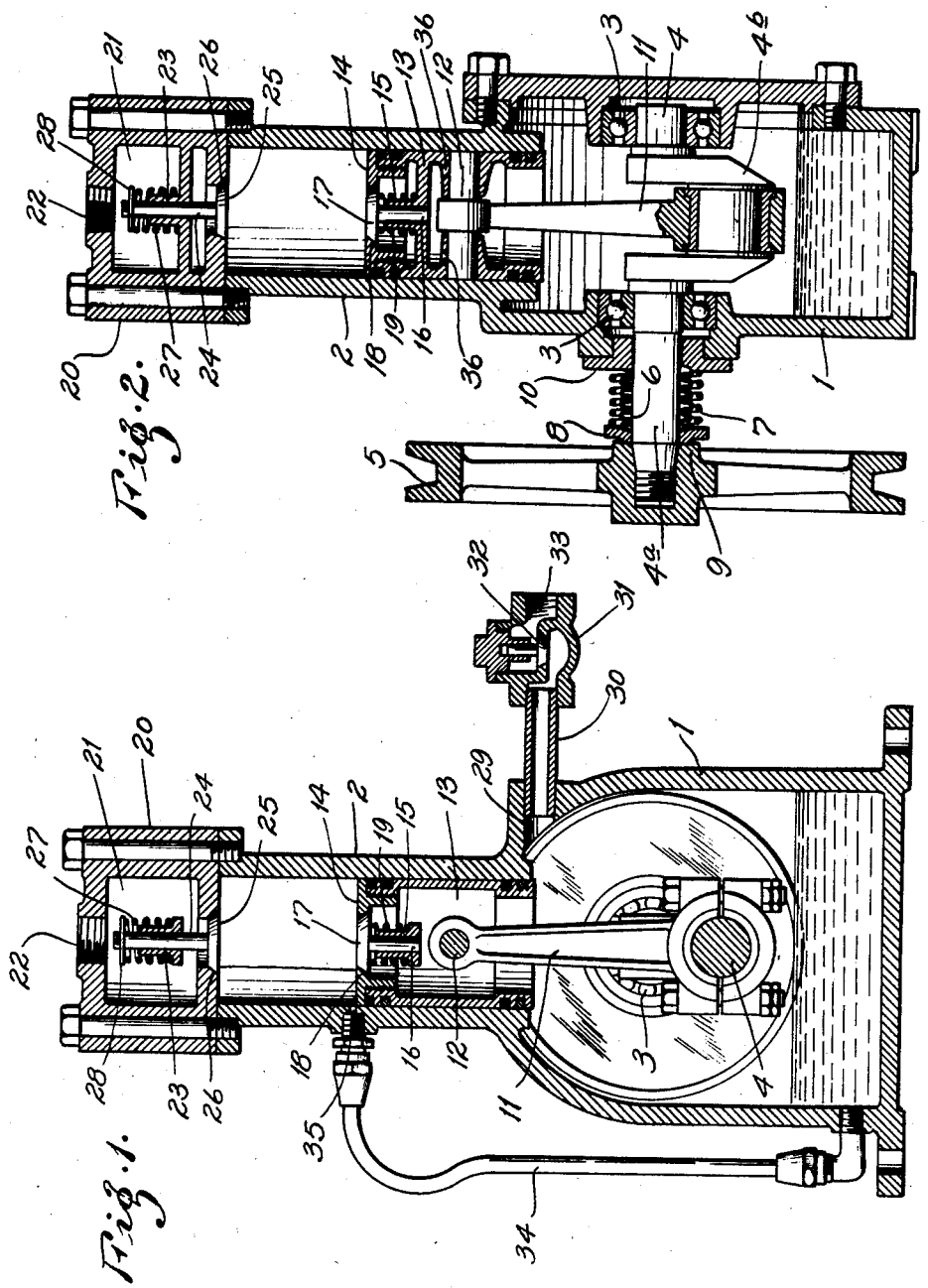
INVENTOR:
WALTER G. E. ROLAFF
BY Elliott Warrington
ATTORNEYS.

Patented Mar. 10, 1931

1,795,445

UNITED STATES PATENT OFFICE

WALTER G. E. ROLAFF, OF KIRKWOOD, MISSOURI

RECIPROCATING COMPRESSOR

Application filed November 21, 1927. Serial No. 234,690.

The general object of this invention is to provide a pump or compressor of the reciprocating type having a novel organization and operation of parts in association with means for insuring the thorough lubrication of the working parts in a novel and effective manner.

In the following specification, I will refer to my invention as a compressor, although, as will be readily understood, the organization of parts described will operate equally well as a pump. Also, for the sake of brevity, I will refer to the medium being compressed as air, although it will be readily understood that the invention can be utilized with any compressible medium.

In compressors of the reciprocating type, lubrication of the working parts is effected either by what is known as the "splash system", in which the lubricant in the crank-case is continuously thrown over the working parts by the rapid rotation of the crank-shaft, which is submerged, or partially submerged, in the lubricant, or else a pump is provided for forcing the lubricant to desired points of application to the working parts. The first system is unreliable, and not wholly efficient, and the danger is always present of the operator or attendant failing to maintain sufficient oil in the crank-case to permit of its being splashed over the working parts. The second system, that of pumping the oil to points of distribution, is, of course, efficient, but it necessitates the use of an auxiliary pump or compressor and involves an added item of expense and care.

Furthermore, in many types of reciprocating compressors, the air to be compressed is drawn into the crank-case in the outward stroke of the piston, which is valved to permit of its passage through the piston in the inward stroke of the latter. In the next outward stroke of the piston, the compression occurs beyond the piston in the compression space of the cylinder and in the next inward stroke another body of air to be compressed is withdrawn from the crank-case. The latter, therefore, is always under relatively low pressure.

According to my invention, I utilize the crank-case as a pressure chamber, forcing in the air through a valve in the piston in the outward stroke of the latter and drawing in fresh air during the inward stroke into the cylinder immediately above the piston, the outlet of which is, in the present embodiment of the invention, controlled by a check valve. The compression of air in the cylinder and crank-case, respectively, will occur, therefore, in both the outward and inward strokes of the piston, and the compressed air is forced from the crank-case through a pipe line provided with a valve which permits the air to be expelled from the crank-case but prevents back pressure from the compression tank or other place of storage of the compressed air from being returned to the crank-case.

To lubricate the compressor, I maintain the crank-case or other pressure chamber with an adequate supply of lubricant and provide an oil line leading from the bottom of the crank-case to a port communicating with the interior of the cylinder preferably at a defined distance above the outer end of the piston when the latter is in its inmost position. By reason of the fact that the crank-case is always under pressure, at each inward stroke of the piston the lubricant will be forced through the oil line under pressure and into the cylinder above the piston. This lubricant not only lubricates the cylinder wall but, by passing through the valve in the head of the piston, will fall upon or be distributed to the wrist-pin of the piston and also flow over the crank-arm to the bearing of the latter on the crank-shaft and thoroughly lubricate the latter as well as the bearings of the crank-shaft within the crank-shaft casing.

In addition to this positive feed of the lubricant, lubrication of the crank-shaft and other working parts will be effected in some degree by splashing and by continuous displacement of the lubricant within the crank-case by the high pressure maintained therein.

Having thus set forth the general nature of my invention and the purposes to be subserved thereby, I will now proceed to describe the same in detail, referring to the accompanying drawing, in which—

Figure 1 is a cross-sectional view through a compressor constructed according to my invention; and Figure 2 is a cross-sectional view but taken on a line at right-angles to that on which Fig. 1 is taken.

Referring now to the drawing, the numeral 1 indicates the crank-case of the compressor on the upper end of which is mounted a cylinder 2 in communication with the crank-case. Mounted in suitable bearings 3 in the crank-case is a crank-shaft 4, said crank-shaft having a portion 4a extending through the wall of the crank-case at one side and having mounted on the end thereof a pulley 5 by means of which the crank-shaft may be driven from any suitable source of power. The portion of the crank-shaft 4a between the bearing 3 and the pulley 5 is surrounded by a metal bellows 6 which, in turn, is surrounded by a coil spring 7, a friction ring 8 receiving the pressure of said metal bellows and spring and bearing against the inner face of the hub 9 of pulley 5. At their opposite ends, the metal bellows 6 is secured to and spring 7 bears against, a sleeve 10 which loosely surrounds the crank-shaft 4a and is suitably secured in an opening in the side wall of the crank-case 1. Air or lubricant escaping from the crank-case around the bearing of the part 4a of the crank-shaft will enter the metal bellows 6 and, being under pressure, will force the friction disk into firm engagement with the face of the hub 9 and thus provide an effective seal against the escape of lubricant. The numeral 4b indicates the crank of the crank-shaft rotatably mounted at its outer end, on which is a crank-arm, or connecting rod, 11 which at its upper end is mounted on a wrist-pin 12 secured on the inner side of a piston 13. The numeral 14 indicates the head of the piston which, as shown, is preferably screwed into the body of the piston, which provides a bearing 15 for receiving a valve stem 16 of a valve 17 mounted in the head 14 and to close an aperture 18 in said head, said valve being normally held in its closed position by a coil spring 19 surrounding the bearing 15 and engaging at its upper end the underside of the valve 17. Mounted on the upper side of the cylinder 2 is a casting 20 providing a chamber 21 having an inlet opening 22. Within the chamber 21 and projecting upwardly from the floor thereof is a cylindrical bearing 23 which receives the valve stem 24 of a valve 25 which controls an opening 26 through the bottom wall of chamber 21. This valve opens downwardly and is normally held in a closed position by a coil spring 27 surrounding the bearing 23 and normally pressing upward against a disk 28 secured on the upper end of the valve stem 24.

At the upper end of the crank-case 1, there is provided an eduction port 29 mounted in which is one end of a pipe 30, the other end of which is secured in one end of a valve casing 31. This valve casing has mounted therein a check valve 32 interposed between the pipe 30 and an outlet port 33 at the opposite end of said valve casing. Communicating with the lower end of the crank-case 1 is one end of a pipe 34, the upper end of which is secured in the side wall of the cylinder 2 and communicates with a port 35 which is so positioned as to be cleared by the head 14 of the piston as the latter reaches the limit of its downward stroke.

It will now be seen that as the piston moves downwardly, the valve 25 will be opened and air will be drawn in through the inlet opening 22 and the valve opening 26 into the upper end of cylinder 2. As the piston moves outwardly, the valve 25 will be closed and the air in the cylinder will be placed under a certain amount of compression until the pressure created is sufficient to overcome the power of spring 19, when valve 17 will be opened, and in the further movement of the piston, air will be forced through opening 13 into the piston and thence into the crank-case 1. As this operation is repeated, an increasingly higher pressure is developed in the crank-case 1 until this pressure is sufficient, with each stroke of the piston, to open the check valve 32 and force the compressed air out of the valve casing through opening 33. As soon as back pressure is exerted, valve 32 will be closed.

As the head of the piston clears the opening 35, pressure in the crank-case will force the lubricant therein (shown by hatched lines) through pipe 34 and out of port 35 into the cylinder. The amount of lubricant thus discharged into the cylinder in each downward movement of the piston is regulated by the size of the port 35. This port is so positioned that it will be opened only momentarily and the size is such that only the desired amount of lubricant will be injected into the cylinder in each cycle of movement of the piston.

While discharge of lubricant into the cylinder will undoubtedly raise the pressure in the suction space of the cylinder, such increase in pressure cannot lower the efficiency of the machine, because at such time the piston has done all of its suction work, the suction valve is closed, and no air sucked into the cylinder for compression can possibly leave the cylinder except when compressed and then it must pass through discharge valve 17.

It will be noted that all oil injected into the cylinder must lodge upon the piston head, so that in the outward or compression stroke, the oil must leave the cylinder first, to be followed by the compressed air; hence, the oil can never be present in the cylinder at the end of a compression stroke to act as a resisting medium to the full outward stroke of the piston, which ordinarily creates objectionable noise and excessive strains upon the working elements. These latter objectionable results obtain in the case of refrigerating machines in which, frequently, unexpanded refrigerant returns to the cylinder during the suction stroke, and, in standard designs of reciprocating machines, cannot leave the cylinder until the end of the compression stroke; and this very often results in serious accidents caused by so-called "blowing off" of the cylinder head.

In each upward movement of the piston, as the valve 17 opens, lubricant in the cylinder will escape through valve opening 13, and this lubricant will drip down over the wristpin 12 and enter the bearings thereof which, as shown by Fig. 2, are provided with suitable openings 36 on their upper sides to permit the entrance of lubricant to the bearing. The lubricant will also flow over the crank-arm 11 to lubricate the bearing of the latter at its lower end on the crank 4b.

As stated in the general description of the invention, in addition to the above means of lubrication, a certain amount of splashing of the oil will undoubtedly occur in the crank-case, so that the bearings 3 and crank-arm bearing will be thoroughly lubricated.

In addition to the injection of oil into the cylinder when the port 35 is uncovered, it will be clear that the oil is being constantly forced against the surface of the piston in its outward stroke and in the area of the piston containing the piston rings a certain amount of lubricant will be forced about the piston rings in the outward stroke of the piston, so that the piston rings will always be thoroughly lubricated in this manner, and such delivery of lubricant, in addition to the injection of the lubricant into the cylinder, will insure that a sealing film of oil will always be maintained upon the cylinder wall.

It will be noted from the above description that the characteristic feature of my invention is the maintenance of the interior of the crank-case under pressure due to the operation of the compressor, and that this pressure is utilized in forcing lubricant from the crank-case into the cylinder to lubricate the latter, as well as other parts, as described.

My improved compressor may be operated in a closed cycle if desired, as for example, in its adaptation to a mechanical refrigerating system. In such adaptation, the low pressure line would be secured in the opening 22 of chamber 21 and the high pressure line in the opening 33 of valve casing 31. In the operation of the compressor, the refrigerant, together with lubricant, would be continuously delivered into the crank-case and the refrigerant under compression discharged to the high pressure line through the opening 33. In this adaptation, the crank-case 1 would act as a separating chamber to permit any lubricant carried through by the refrigerant to separate therefrom and collect in the crankcase.

I claim:—

1. In a reciprocating compressor the combination of a casing affording a pressure chamber having an outlet and adapted to contain a body of lubricant, a cylinder communicating with said pressure chamber and having an inlet opening, a piston working in said cylinder having a valved opening in its head, the valve whereof opens on the outward stroke of the piston, whereby, in operation, compressed air will be delivered into said pressure chamber, and an oil line leading from the pressure chamber below the level of lubricant therein to and communicating with the cylinder at a point thereon adapting it to be alternately opened and closed by the movement of the piston, whereby in each complete cycle of movement of the piston, lubricant will be forced under the pressure in the pressure chamber into the cylinder.

2. In a reciprocating compressor the combination of a casing affording a crank case, a cylinder communicating therewith, a casting on the outer end of said cylinder provided with a chamber and having an opening in its outer wall through which the air to be compressed may be drawn in, and an opening in its lower wall communicating with the cylinder, a valve controlling said opening and adapted to open inwardly, a piston working in said cylinder and having an opening in its head, and a valve controlling said latter opening and adapted to open on the outward stroke of the piston to admit compressed air into the crank case, said crank case having an outlet.

3. In a reciprocating compressor the combination of a casing affording a pressure chamber, a cylinder communicating therewith, a piston working in said cylinder, and valves, located, respectively, in said cylinder and piston and operating to draw air into the cylinder on each inward stroke of the piston and to force it into the pressure chamber on each outward stroke of the piston, said pressure chamber having an outlet, and a conduit leading from the pressure chamber to the cylinder and communicating with the latter at a point above the head of the piston when the latter is in its lowermost position permitting the communication to be closed by the piston in its outward movement, whereby in each of such recurring positions of the piston, lubricant, maintained in the pressure chamber, will be forced under pressure into the cylinder.

4. In a reciprocating compressor the combination of a casing affording a crank-case adapted to contain a body of lubricant, a cylinder communicating therewith, a piston working in said cylinder, and valves located, respectively, in said cylinder and piston and operating to draw air into the cylinder on each inward stroke of the piston and to force it into the crank-case on each outward stroke of the piston, said crank-case having a valved outlet, and a conduit leading from the crank-case below the level of the lubricant therein to the cylinder and communicating with the latter at a point above the head of the piston when the latter is in its lowermost position, causing the communication to be closed by the piston in its outward movement, whereby in each of said recurring positions of the piston, lubricant from the crank-case will be forced under pressure into the cylinder.

5. In a reciprocating compressor the combination of a casing affording a pressure chamber having an outlet and containing a body of lubricant, a cylinder communicating with said pressure chamber and having an inlet opening, a piston working in said cylinder having a valved opening in its head the valve whereof opens on the outward stroke of the piston, a wrist-pin in said piston located immediately under said valve, a crank-operated piston rod having an end pivotally connected to said wrist-pin, and an oil line leading from the pressure chamber below the level of lubricant therein to and communicating with the cylinder at a point thereon causing it to be alternately opened and closed by the movement of the piston, whereby in each complete cycle of movement of the piston, lubricant will be forced under the pressure in the pressure chamber into the cylinder, and in the outward stroke of said piston said lubricant will be forced through the valve opening in the piston and flow onto said wrist-pin and down said piston rod.

In testimony whereof, I have hereunto set my hand.

WALTER G. E. ROLAFF.